United States Patent
Lim et al.

(10) Patent No.: US 7,296,142 B2
(45) Date of Patent: Nov. 13, 2007

(54) MULTI-TIERED RETRY SCHEME FOR READING COPIES OF INFORMATION FROM A STORAGE MEDIUM

(75) Inventors: Ricardo SoonLian Lim, Singapore (SG); Patrick TaiHeng Wong, Singapore (SG); Wesley WingHung Chan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 576 days.

(21) Appl. No.: 10/603,015

(22) Filed: Jun. 24, 2003

(65) Prior Publication Data

US 2004/0268034 A1 Dec. 30, 2004

(51) Int. Cl.
*G06F 9/00* (2006.01)
*G06F 11/00* (2006.01)

(52) U.S. Cl. ............... 713/1; 713/1; 713/2; 713/100; 714/2; 714/6; 714/20

(58) Field of Classification Search ............ 714/2, 714/5, 6, 7, 763, 76; 369/13.03, 13; 713/1, 713/2, 100; 711/100, 148, 1
See application file for complete search history.

(56) References Cited

U.S. PATENT DOCUMENTS

| | | | |
|---|---|---|---|
| 5,371,745 A * | 12/1994 | Kiyonaga et al. | 714/758 |
| 5,392,267 A * | 2/1995 | Mikamo | 369/47.13 |
| 5,504,726 A * | 4/1996 | Semba | 369/44.28 |
| 5,682,272 A * | 10/1997 | Taroda et al. | 360/53 |
| 5,844,920 A | 12/1998 | Zook et al. | 371/40.14 |
| 5,872,671 A * | 2/1999 | Suzuki et al. | 360/75 |
| 6,026,068 A * | 2/2000 | Obata et al. | 369/53.2 |
| 6,122,235 A * | 9/2000 | Arai | 369/53.35 |
| 6,233,108 B1 * | 5/2001 | Inoue | 360/53 |
| 6,247,152 B1 * | 6/2001 | Russell | 714/718 |
| 6,263,454 B1 * | 7/2001 | Gold et al. | 714/25 |
| 6,289,483 B1 | 9/2001 | Ohtaki | 714/769 |
| 6,332,204 B1 * | 12/2001 | Russell | 714/710 |
| 6,384,999 B1 | 5/2002 | Schibilla | 360/53 |
| 6,393,580 B1 * | 5/2002 | Harada | 714/2 |
| 6,414,926 B1 * | 7/2002 | Sugiyama et al. | 369/53.35 |
| 6,427,215 B2 * | 7/2002 | Rafanello et al. | 714/710 |
| 6,545,832 B1 * | 4/2003 | Sugawara et al. | 360/53 |
| 6,918,054 B2 * | 7/2005 | Hirata et al. | 714/17 |
| 6,941,488 B2 * | 9/2005 | Ng et al. | 714/7 |
| 2001/0010085 A1 * | 7/2001 | Rafanello et al. | 714/710 |
| 2002/0057510 A1 * | 5/2002 | Hoskins et al. | 360/53 |
| 2002/0114243 A1 * | 8/2002 | Ohta | 369/53.35 |

* cited by examiner

*Primary Examiner*—Rehana Perveen
*Assistant Examiner*—Nitin C. Patel
(74) *Attorney, Agent, or Firm*—Westman, Champlin & Kelly

(57) ABSTRACT

Minimal and maximal numbers are established defining two levels of retry attempts to read system information from a storage medium. Multiple copies of the system information are stored on the storage medium. Attempts are made to successively read the copies until either the system information is successfully read or the system information is not successfully read from any copy of the system information after the minimal number of attempts on each copy. If the system information is not successfully read, attempts are made to successively read the copies until either the system information is successfully read or the system information is not successfully read from any copy of the system information after the maximal number of attempts.

20 Claims, 2 Drawing Sheets

MULTI-TIERED RETRY SCHEME FOR READING COPIES OF INFORMATION FROM A STORAGE MEDIUM

FIELD OF THE INVENTION

This invention relates to loading system data to a processor from a storage device.

BACKGROUND OF THE INVENTION

Modern data storage devices require certain data, called "system information", concerning the configuration and operation of the storage device. System information includes, for example, information concerning zone configuration and the frequency at which user data are stored in various zones, identification of data sectors that are defective, reassignment tables that associate virtual addresses to physical addresses on the storage medium, information concerning the configuration of servo regions between data sectors, etc. System information is used by the data storage device controller to control operation of the data storage device during its operation. Typically, system information is stored in data sectors, known as "system sectors", reserved for this class of data. Due to its criticality, it is common to store several copies of system information in the system sectors. For example, in magnetic disc drives, it is common to store at least three copies of the drive information. The extra copies are stored to serve as back-up in case of corruption to data and defects growth.

At power on to the data storage device, the system information is read to the device controller to govern operation of the storage device. It is common to perform multiple retries of a single copy of the system information before attempting to read another copy. More particularly, the storage device firmware will trigger the retry scheme to attempt to read back system information from the single copy. If the copy contains uncorrectable data error, all retries in the scheme will be exhausted before the next copy of the system information is attempted to be read. Typically, attempted reading a given copy of the system information is retried a predetermined number of times, 100 or more retries being typical for a given copy of the system information. If reading of that copy is unsuccessful after the predetermined number of retries, the process moves on to the next copy of the system information to attempt to read the next copy. The process continues until either the system information is successfully read, or all copies of the system information cannot be read after attempting to read the data from each copy the predetermined number of retries. While three copies of system information is usually stored in the system sectors, five or more copies of particularly critical system information, such as sector defect lists and the like, might be stored.

These retries require considerable upload time, which is especially adverse where design constraints require the storage device to be ready in a specific period of time. In a worse case scenario, all but the last copy of the storage device information is corrupted, resulting in all retries in the retry scheme being attempted for all of the bad copies before the last good copy is uploaded.

Experiments conducted for measuring the time for uploading system data reveals that each uncorrectable copy of system information may take as much as four seconds to exhaust all the retries in the retry scheme. Consequently, if a system has three copies of system information stored in the area reserved for the system information, and if the first two copies of the system information are corrupted and unrecoverable, the time required to upload the system information will require an additional eight seconds. In most cases, particularly where specifications for the data storage device require a shorter time, the amount of time required for repeating the retries is unacceptable.

The present invention provides a solution to this and other problems, and offers other advantages over the prior art.

SUMMARY OF THE INVENTION

In one embodiment of the invention, minimal and maximal numbers are established defining two levels of retry attempts to read system information stored on a storage medium. Multiple copies of the system information are stored on the storage medium. Attempts are made to successively read the copies until either the system information is successfully read or the system information is not successfully read from any copy of the system information after the minimal number of attempts. If the system information is not successfully read, attempts are made to successively read the copies until either the system information is successfully read or the system information is not successfully read from any copy of the system information after the maximal number of attempts.

In preferred embodiments, if the system information is successfully read or if the system information is not successfully read in the maximal number of attempts, the process is ended.

In a second embodiment of the invention, the process is performed by a computer or processor operation under control of program code.

In a third embodiment of the invention, the system information concerns a disc drive storage device of claim 18, and the storage medium is a storage medium of the disc drive storage device. The storage medium includes a plurality of sectors and the multiple copies of the system information are stored in predetermined sectors, and the program code is in firmware in a device processor.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
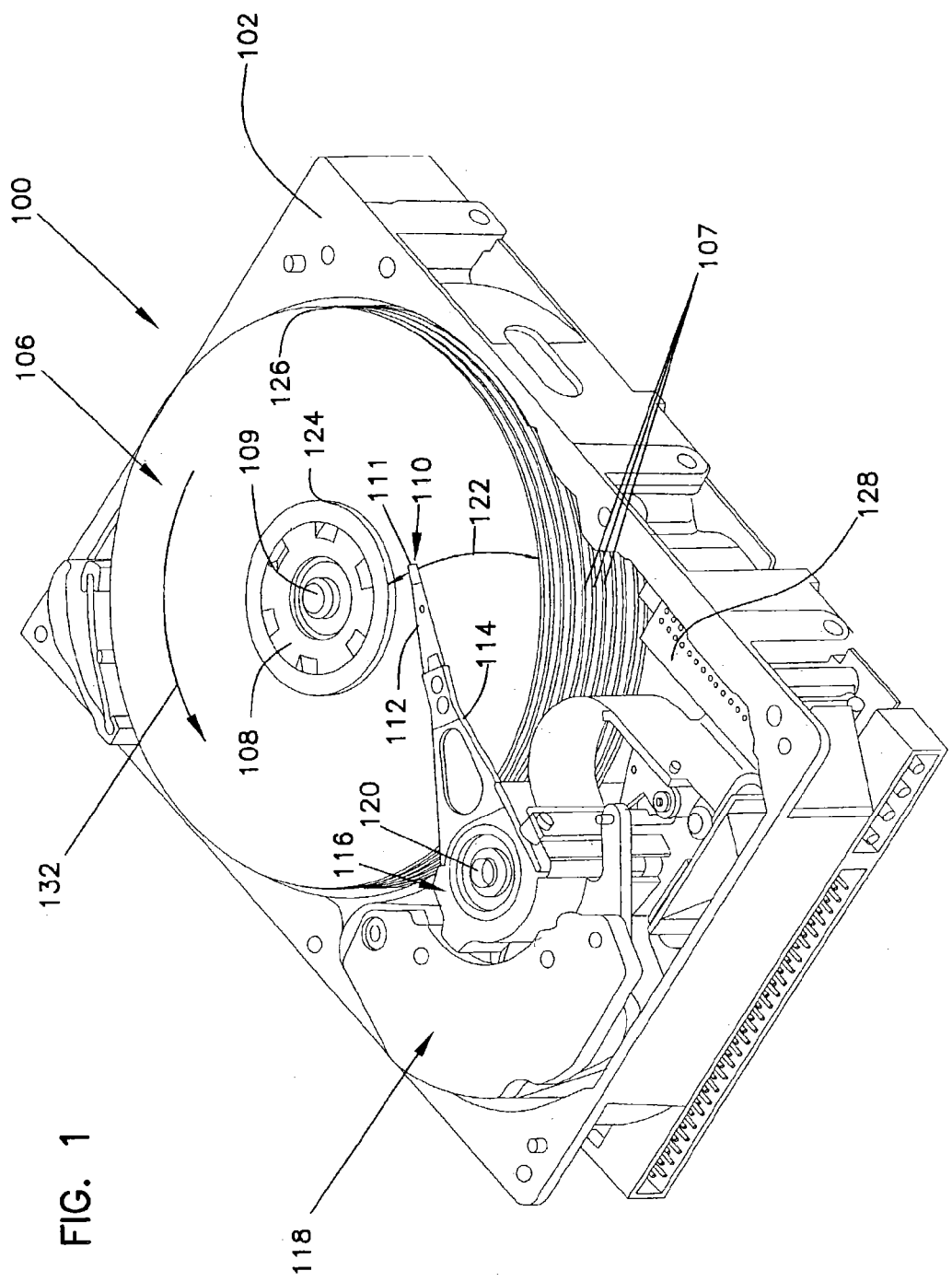
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108 for rotation in the direction of arrow 132. Disc pack 106 includes a plurality of individual magnetic recording discs 107, which are mounted for co-rotation about central axis 109. Each disc surface has an associated slider 110 that is mounted in disc drive 100 for communication with the confronting disc surface. Slider 110 is arranged to fly above the associated disc surface of an individual disc of disc pack 106, and carries a transducing head 111 arranged to write data to, and read data from, sectors on concentric tracks on the confronting disc surface. In the example shown in FIG. 1, sliders 110 are supported by suspensions 112 which are in turn attached to track accessing arms 114 of an actuator 116. Actuator 116 is driven by a voice coil motor (VCM) 118 to rotate the actuator, and its attached sliders 110, about a pivot shaft 120. Rotation of actuator 116 moves the heads along an arcuate path 122 to position the heads over a desired data track between a disc inner diameter 124 and a disc outer diameter 126.

Voice coil motor 118 is operated by position signals from a processor included in circuit board 128, which in turn are based on error signals generated by heads 111 and position signals from a host computer (not shown). Read and write electronics are also included on circuit board 128 to supply signals to the host computer based on data read from disc pack 106 by the read portions of heads 111, and to supply write signals to the write portions of heads 111 to write data to the discs.

In the disc drive of FIG. 1, system information concerning the disc drive 100 is stored in preselected sectors, called "system sectors" on one of the discs 111. More particularly, drive configuration information, data recording frequency information, and other parameters necessary to operate the disc drive are stored in the system sectors. Also, since some sectors of the disc drive may be defective, a table of defective sectors or map to good sectors may be stored in the system sectors. Typically, plural copies of the system information are stored in the system sectors, three or more copies being common in most systems. In some cases, five or more copies of certain particularly critical information, such as sector defect tables, may be stored.

In accordance with the present invention, the amount of time required for start-up of the storage device is minimized by limiting the number of retries for reading each copy of the system information to a smaller number than is ordinarily attempted, and expanding the retry attempts to the full number only after limited retry attempts are made to all copies. Thus, after a predetermined limited number of unsuccessful retries at reading a given copy of the system information, the process moves on to the next copy of the system information, attempting to read that information a predetermined limited number of times. The process continues through all copies of the system information until either the information is successfully read, or all copies have been unsuccessfully read the limited number of times. At that point, the process reverts to the ordinary process, reading each copy of the system information the full compliment of retries.

Figure 2:
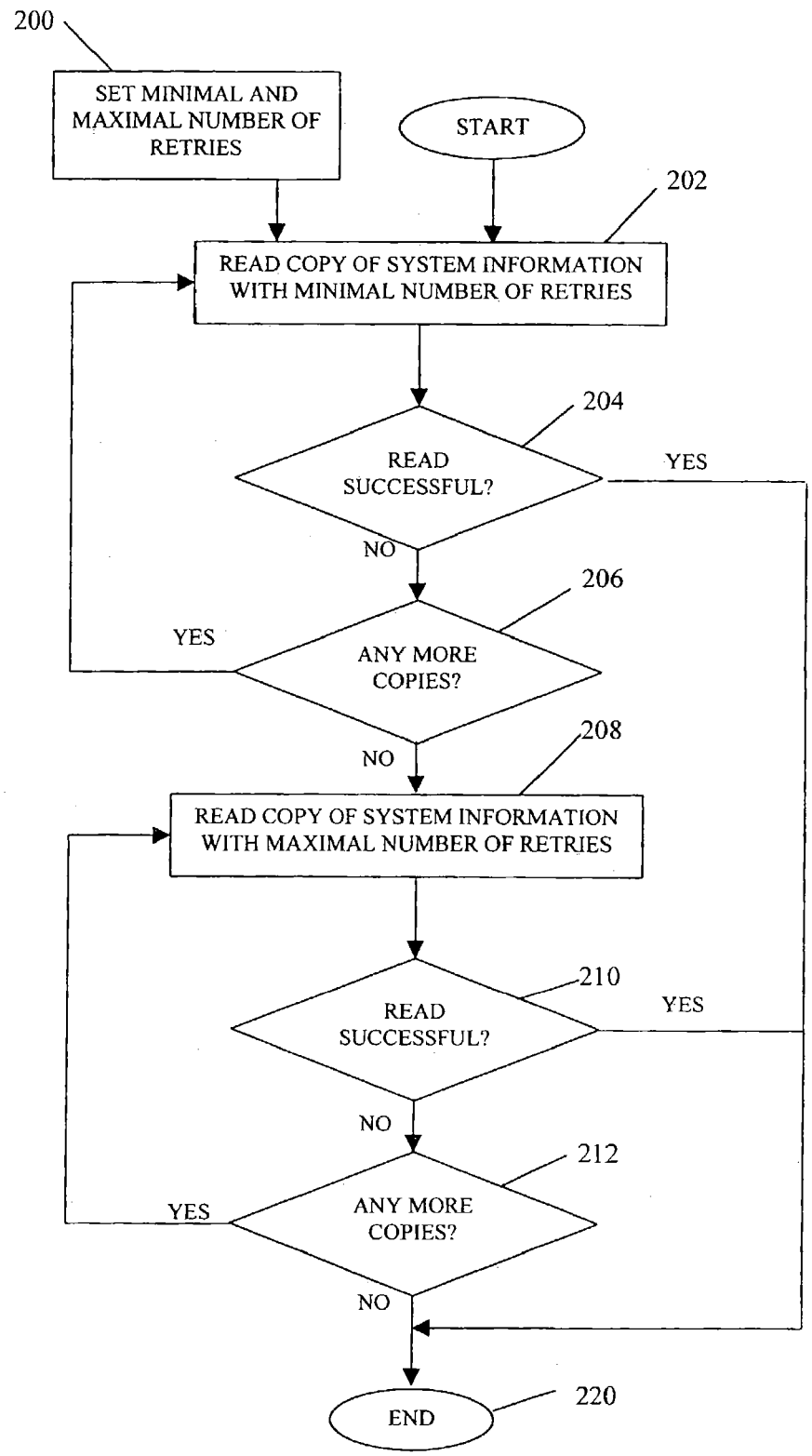
FIG. 2 is a flowchart of the system information download retry scheme according to an embodiment of the present invention.

FIG. 2 is a flowchart of the process according to one embodiment of the invention. At step 200 a predetermined number of retries is selected. The number of retries is limited to a relatively small number, such as 5 or 10 retries, as compared to 100 or more for a normal number of retries. At step 202, an attempt is made to read a first copy of the system information. If the attempt is unsuccessful, the attempt to read the first copy is repeated the number of times identified at step 200. If one of the attempts to read the system information is successful, then at step 204 the process advances to step 220 to end. Otherwise, if the attempts to read the system information is unsuccessful for the number of retry attempts selected at step 200, then at step 204 the process advances to step 206.

At step 206, check if another copy of the system information is available. If it is, the process loops back to step 202 and attempts reads the next copy of the system information until either the system information has been successfully read, or the predetermined minimum number of retries is exhausted for that copy. The process continues to iterate through steps 202, 204 and 206 until the attempts have been made to read all copies of the system information the limited number of times established at step 200.

If, after step 206, all of the copies of the system information have been unsuccessfully read the predetermined minimum number of times, the process continues to step 208 where the first copy of the system information is attempted to be read the full number of retries, such as 100 or more times. If the system information is successfully read at step 210, the process ends at step 220. If not, then at step 212 the process loops back to read the next copy of system information. The process continues until all of the copies have been attempted to be read the full compliment of retries.

Table 1 identifies the advantages of the present invention showing the time necessary for loading each bad copy of the system information based on the full number of retries, which in this case is 100, requiring four seconds, versus a limited number of retries of 10 and 5 retries each, requiring 480 microseconds (ms) and 110 ms, respectively.

TABLE 1

| Number of Retries | Time to load bad copy |
|---|---|
| 100 | 4 sec |
| 10 | 480 ms |
| 5 | 110 ms |

In preferred embodiments, the invention is carried out by a processor or computer operating under control of a readable program that contains program code to cause the computer or processor to perform the process shown in FIG. 2. In some embodiments, the program code is included in firmware, such as on circuit board 128 (FIG. 1) so that the processor can perform the reading of the system information upon power-up of the disc drive.

Although the present invention has been described with reference to a magnetic disc drive, those skilled in the art will recognize that the present invention may be practiced with systems employing other technologies, such as optical disc drives, tape drives and re-writeable drives. The invention can also be practiced with integrated circuit memories, including RAMs, ROMs and programmable memories.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application of the invention while maintaining substantially the same functionality without departing from the scope and spirit of the present invention.

What is claimed is:

1. A process for reading information from a storage medium on which multiple copies of the information are stored, the process comprising:

a) establishing minimal and maximal numbers of read retry attempts;

b) iteratively attempting reading successive copies of the information until either the information is successfully read or the information is not successfully read from any copy of the information after the minimal number of attempts; and c) if the information is not successfully read in step (b), iteratively attempting reading successive copies of the information until either the information is successfully read or the information is not successfully read from any copy of the information after the maximal number of attempts.

2. The process of claim 1, further including:

d) if the information is successfully read or if the information is not successfully read in step (c), ending the process.

3. The process of claim 1, wherein the attempt to read the information of step (b) is performed on each copy of the information successively up to the minimal number of attempts.

4. The process of claim 3, wherein the attempt to read the information of step (c) is performed on each copy of the information successively up to the maximal number of attempts.

5. The process of claim 4, further including:

d) if the information is successfully read or if the information is not successfully read in step (c), ending the process.

6. The process of claim 3, further including:

d) if the information is successfully read or if the information is not successfully read in step (c), ending the process.

7. A computer useable medium having a computer readable program embodied therein for addressing data to attempt to read information from a storage medium on which multiple copies of the information are stored, the computer readable program comprising:

first computer readable program code for causing the computer to establish minimal and maximal numbers of read retry attempts;

second computer readable program code for causing the computer to iteratively attempt to read successive copies of the information until either the information is successfully read or the information is not successfully read from any copy of the information after the minimal number of attempts; and third computer readable program code for causing the computer to respond to an unsuccessful reading of the information by the second program code to cause the computer to iteratively attempt to read successive copies of the information until either the information is successfully read or the information is not successfully read from any copy of the information after the maximal number of attempts.

8. The computer useable medium of claim 7, further including:

fourth computer readable program code for causing the computer respond to successful reading of the information to cause the computer to end reading attempts, and fifth computer readable program code for causing the computer to respond to unsuccessful reading of the information by the computer in response to execution of the third program code to cause the computer to end reading attempts.

9. The computer useable medium of claim 7, wherein the attempt to read the information performed by the computer by the second program code is performed on each copy of the information successively up to the minimal number of attempts.

10. The computer useable medium of claim 9, wherein the attempt to read the information performed by the computer by the third program code is performed on each copy of the information successively up to the maximal number of attempts.

11. The computer useable medium of claim 10, further including:

fourth computer readable program code for causing the computer respond to successful reading of the information to cause the computer to end reading attempts, and fifth computer readable program code for causing the computer to respond to unsuccessful reading of the information by the computer in response to execution of the third program code to cause the computer to end reading attempts.

12. The computer useable medium of claim 9, further including:

fourth computer readable program code for causing the computer respond to successful reading of the information to cause the computer to end reading attempts, and fifth computer readable program code for causing the computer to respond to unsuccessful reading of the information by the computer in response to execution of the third program code to cause the computer to end reading attempts.

13. A disc drive storage device comprising:

a storage medium for storing data including multiple copies of an information;

a processor; and firmware defining a computer readable program that causes the processor to attempt to read the information from the storage medium, the firmware comprising:

first program code for causing the processor to establish minimal and maximal numbers of read retry attempts;

second program code for causing the processor to iteratively attempt to read successive copies of the information until either the information is successfully read or the information is not successfully read from any copy of the information after the minimal number of attempts; and third program code for causing the processor to respond to an unsuccessful reading of the information by the second program code to cause the processor to iteratively attempt to read successive copies of the information until either the information is successfully read or the information is not successfully read from any copy of the information after the maximal number of attempts.

14. The disc drive storage device of claim 13, wherein the attempt to read the information performed by the processor by the second program code is performed on each copy of the information successively up to the minimal number of attempts.

15. The disc drive storage device of claim 14, wherein the attempt to read the information performed by the processor by the third program code is performed on each copy of the information successively up to the maximal number of attempts.

16. The disc drive storage device of claim 13, wherein the attempt to read the information performed by the processor by the third program code is performed on each copy of the information successively up to the maximal number of attempts.

17. The disc drive storage device of claim 13, wherein the storage medium includes a plurality of sectors and the multiple copies of the information is stored in predetermined sectors.

18. The disc drive storage device of claim 13, wherein the firmware further includes:
   fourth program code for causing the processor respond to successful reading of the information to cause the processor to end reading attempts, and
   fifth computer readable program code for causing the processor to respond to unsuccessful reading of the information by the processor in response to execution of the third program code to cause the processor to end reading attempts.

19. The disc drive storage device of claim 18, wherein the attempt to read the information performed by the processor by the second program code is performed on each copy of the information successively up to the minimal number of attempts and the attempt to read the information performed by the processor by the third program code is performed on each copy of the information successively up to the maximal number of attempts.

20. The disc drive storage device of claim 18, wherein the storage medium includes a plurality of sectors and the multiple copies of the information is stored in predetermined sectors.

* * * * *